United States Patent Office 3,598,544
Patented Aug. 10, 1971

3,598,544
CRYSTAL MODIFICATION OF INORGANIC SALTS
Arthur S. Teot, Midland, Mich., assignor to The Dow Chemical Company, Midland, Mich.
No Drawing. Filed Dec. 22, 1969, Ser. No. 887,405
Int. Cl. B01d 9/02; B01j 17/04
U.S. Cl. 23—300
3 Claims

ABSTRACT OF THE DISCLOSURE

Disclosed herein is an improved method for crystallizing ammonium sulphate, potassium nitrate, or potassium chromate by cooling an aqueous system wherein one of these three salts is dissolved. The improvement comprises adding a small amount of an ammonium, sodium, or potassium alkylated diphenyl ether mono- or disulphonate to the crystallizing system.

The sulphonate is characterized by the formula:

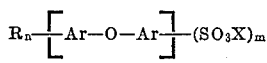

wherein the enclosed molecular nucleus represents a non-halogenated diaryl oxide in which Ar is a monocyclic aromatic radical of the benzene series, R is a hydrophobic substituent containing from 8 to 48 carbon atoms, inclusive in continuous carbon-carbon bonds, $n$ is an integer from 1 to 3, and $m$ is an integer from 1 to 2.

The "X" portion of the sulphonate group is a hydrogen displaceable ion. Suitable ions are sodium, potassium and ammonium. The resulting crystals are larger and more regularly shaped than crystals produced by prior art methods.

BACKGROUND OF THE INVENTION

In the art of crystal habit modification, it is known that sulphonated alkyl diphenyl ethers can sometimes be employed to modify crystallization of specific inorganic salts from an aqueous media (e.g., Nylander U.S. 3,271,106). Where successful, the crystals produced from the sulphonate containing media are larger or possess a more desirable shape than is the case where crystallization is allowed to proceed naturally. Unfortunately, the mechanism by which crystal modification is achieved is not well understood and, as a result, success or failure of a particular crystal modification technique is highly empirical, and results cannot be generalized.

The present invention is based upon the discovery that ammonium, sodium and potassium alkyl diphenyl ether mono- or disulphonates improve crystallization of $(NH_4)_2SO_4$, $KNO_3$, and $K_2CrO_4$ from their respective aqueous solutions.

SUMMARY OF THE INVENTION

In the present invention, a small amount of an ammonium, sodium or potassium alkylated diphenyl ether mono- or disulphonate is added to an aqueous solution of ammonium sulphate, potassium nitrate or potassium chromate. Crystallization of the salt is then brought about by conventional means such as evaporation of the solvent, or cooling, or a combination of both methods. The resulting crystals are both larger and more symmetrical than if crystallization had been allowed to proceed without incorporation of the sulphonate into the crystallization media.

In the crystallization process, the amount of sulphonate employed is from about 0.0005 to about 0.5 weight percent of the amount of inorganic salt solubilized prior to the beginning of crystallization. Preferably, the amount of sulphonate employed is from about 0.005 to about 0.1 percent by weight of the inorganic salt.

The sulphonate is characterized by the formula:

wherein the enclosed molecular nucleus represents a non-halogenated diaryl oxide in which Ar is a monocyclic aromatic radical of the benzene series, R is a hydrophobic substituent containing from 8 to 48 carbon atoms, inclusive in continuous carbon-carbon bonds, $n$ is an integer from 1 to 3, and $m$ is an integer from 1 to 2. If $m=1$, then the total hydrophobic substituent contains from 8 to 24 carbon atoms. If $m=2$, then the total hydrophobic substituent contains 16 to 48 carbon atoms. Hydrophobic groups may be aryl, cycloaliphatic or aliphatic. "Continuous carbon-carbon bonds" refers to carbon to carbon linkages contained in aromatic rings as well as aliphatic straight chain molecules. For example, hexylbenzene is within the above definition. The "X" portion of the sulphonate group is a hydrogen displaceable ion. Suitable ions are sodium, potassium and ammonium.

Suitable sulphonates are, for example, the dipotassium and disodium salts of dialkylated ethers such as the octylated and decylated diphenyl ether disulphonates. Other suitable sulphonates are the sodium, potassium, and ammonium sulfonic acid salts of: pentadecyl diphenyl ethers, dicosyl diphenyl ethers, decylpentadecyl diphenyl ethers, didecyl diphenyl ethers, dodecylpentadecyl diphenyl ethers, pentadecyloctadecyl diphenyl ethers, decyldodecyl diphenyl ethers, pentadecyl para-hydroxy diphenyl ethers, dicosyl meta-para-dihydroxy diphenyl ethers, decyldodecyl ortho-para-dihydroxy diphenyl ethers, decylpentadecyl meta-hydroxy diphenyl ethers, pentadecyloctadecyl ortho-hydroxy diphenyl ethers, decylphenyl diphenyl ethers, and didodecylphenyl diphenyl ethers. Preferably, the sulphonate is a disodium dodecylated diphenyl ether disulphonate.

Preferably, in carrying out the crystallization process of the invention, water, sulphonate, and the inorganic salt (i.e. $(NH_4)_2SO_4$, $KNO_3$ or $NaHCO_3$) are admixed. The mixture is heated sufficiently to solubilize the reagents, and the resulting solution is filtered to remove any solid material. The mixture is then allowed to cool slowly to about 25° C. over a period of several hours during which time crystal formation occurs.

The following examples are submitted to illustrate the invention:

EXAMPLE I

The following materials were charged into a large beaker: 1100 grams of deionized water, 1210 grams of $KNO_3$ and 18.75 grams of a 1% (by weight) aqueous solution of disodium dodecylated diphenyl ether disulphonate.

The disulphonate consisted essentially of 80% by weight of the mono alkylated salt, i.e.,

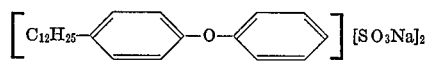

and about 20% by weight of a mixture of

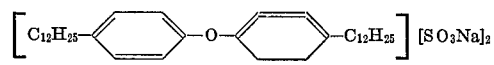

and

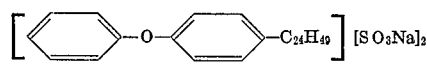

The sulphonate present was about 0.015 percent by weight of the potassium nitrate. The mixture was heated to boiling and was filtered through a two micron filter into a 2 liter flask. The flask was placed in a large heated water bath. The mixture was agitated slowly as the temperature was allowed to decrease gradually to room temperature.

The cooling rate was about 6.8°/hour and the time required for cooling was about 4.5 hours.

The $KNO_3$ crystallizes in the form of rods having aspect ratios of from 6:1 to 12:1. In the absence of the disulphonate, the $KNO_3$ crystallizes as imperfectly formed rectangles of varying sizes.

EXAMPLE II

Using $KNO_3$ as the salt, crystallization was carried out under conditions substantially similar to those in Example I. The concentration of disulphonate, however, was about 0.005 percent based on the weight of the $KNO_3$. The $KNO_3$ crystallized as a mixture of substantially regularly formed square and elongated rectangular tablets.

EXAMPLE III

Ammonium sulphate was crystallized in two runs carried out under conditions substantially similar to those of Example I. In the first run, the concentration of the disulfonate was about 0.01% based on the weight of the $NH_4SO_4$. In the second run, the disulfonate concentration was about 0.015 based on the weight of the ammonium sulphate.

In the first run, a few large square crystals were produced and in the second run, at higher disulphonate concentration, substantially all crystals were large and square-shaped. In the absence of disulphonate, the ammonium sulfate crystallized as a mixture of small malformed rods and rhombohedra.

EXAMPLE IV

Two runs were conducted wherein the salt was potassium chromate ($K_2CrO_4$). In run 1, the concentration of sulphonate was 0.002 weight percent based on the weight of $K_2CrO_4$. In run 2, the sulphonate concentration was 0.005 weight percent. In run 1, the $K_2CrO_4$ crystallized as a mixture of large rhombohedral crystals and large "rod-shaped" crystals. In run 2, the $K_2CrO_4$ crystals were large as in run 1. However, the surfaces of the crystals were rounded and the crystals of run 2 were therefore less desirable than those of the first run. In the absence of disulphonate, the $K_2CrO_4$ crystals were generally small and irregularly shaped.

EXAMPLE V

A series of runs were carried out under conditions substantially similar to those of Example I. The salts tested were cupric sulfate ($CuSO_4$), magnesium chloride, sodium bicarbonate and sodium carbonate. The crystals formed by each salt were either unaffected, or were irregularly shaped and reduced in size in relation to crystals produced in the absence of sulphonate.

I claim:

1. In a process for crystallizing ammonium sulphate, potassium nitrate, or potassium chromate from an aqueous system, the improvement which comprises incorporating into the aqueous system a small amount of sodium, potassium or ammonium alkylated diphenyl ether disulphonate wherein the alkyl group has from 16 to 48 carbon atoms.

2. A process as in claim 1 wherein from about 0.0005 to about 0.5 weight percent of disulphonate is present in the aqueous system based on the weight of inorganic salt present therein.

3. A process as in claim 2 wherein the disulphonate is a disodium dodecylated diphenyl ether disulphonate.

References Cited

UNITED STATES PATENTS

| | | | |
|---|---|---|---|
| 2,099,079 | 11/1937 | Rumscheidt | 23—300 |
| 2,226,101 | 12/1940 | Ogden | 23—300 |
| 2,616,788 | 11/1952 | Bulchart | 23—302 |
| 3,271,106 | 9/1966 | Nylander | 23—302 |

OTHER REFERENCES

Mullin, Crystallization, page 132.

NORMAN YUDKOFF, Primary Examiner

S. SILVERBERG, Assistant Examiner

U.S. Cl. X.R.

23—302